United States Patent [19]

Papai et al.

[11] Patent Number: 4,780,268

[45] Date of Patent: Oct. 25, 1988

[54] NEUTRON ABSORBER ARTICLES

[75] Inventors: John S. Papai, Level Green; Leopoldo Marti-Balaguer, Wilkins Township, Allegheny County, both of Pa.

[73] Assignee: Westinghouse Electric Corp., Pittsburgh, Pa.

[21] Appl. No.: 620,226

[22] Filed: Jun. 13, 1984

[51] Int. Cl.$^4$ .............................................. G21F 1/08
[52] U.S. Cl. .................... 376/272; 250/518.1
[58] Field of Search ............... 250/506.1, 507.1, 518.1; 376/272; 428/472; 252/633

[56] References Cited

U.S. PATENT DOCUMENTS

| | | | |
|---|---|---|---|
| 3,103,479 | 9/1963 | Ransohoff | 204/193.2 |
| 3,122,509 | 2/1964 | Handwerk et al. | 252/301.1 |
| 3,185,652 | 5/1965 | Kleber et al. | 252/478 |
| 3,189,445 | 6/1965 | Calkins et al. | 75/170 |
| 3,362,813 | 1/1968 | Ziolkowski | 75/128 |
| 3,427,222 | 2/1969 | Biancheria et al. | 176/68 |
| 3,736,648 | 6/1973 | Spielberg et al. | 29/473.1 |
| 3,791,191 | 12/1973 | Jones | 176/86 R |
| 3,859,533 | 1/1975 | Suvanto | 250/507 |
| 3,962,587 | 6/1976 | Dufrane et al. | 250/506.1 |
| 4,006,362 | 2/1977 | Mollon et al. | 250/518 |
| 4,010,375 | 3/1977 | Wachter et al. | 250/507 |
| 4,039,842 | 8/1977 | Mollon | 250/518.1 |
| 4,156,147 | 5/1979 | Naum et al. | 376/272 |
| 4,176,093 | 11/1979 | Zoch | 252/478 |
| 4,213,883 | 7/1980 | Owens | 252/478 |
| 4,218,622 | 8/1980 | McMurty et al. | 250/518 |
| 4,292,528 | 9/1981 | Shaffer et al. | 250/506 |

FOREIGN PATENT DOCUMENTS

| | | | |
|---|---|---|---|
| 1816856 | 6/1973 | Fed. Rep. of Germany | 250/506.1 |
| 2614185 | 10/1977 | Fed. Rep. of Germany | |
| 0090597 | 8/1978 | Japan | 250/506.1 |
| 0026297 | 2/1983 | Japan | 250/518.1 |

OTHER PUBLICATIONS

ASTM A424-80, "Standard Specification for Steel Sheet for Porecelain Enameling".
Military Specification: "Coating, Metallic-Ceramic," No. MIL-C-81751B, dated 1/17/72.
Metals Handbook, 9th Edition, vol. 5, pp. 509-531, (1982).
Kirk-Othmer, "Encyclopedia of Chemical Technology," Third Edition, vol. 9, pp. 1-20, (1980).

*Primary Examiner*—Deborah L. Kyle
*Assistant Examiner*—Richard W. Wendtland

[57] ABSTRACT

A neutron absorber element is composed of a metallic substrate bonded to a refractory coating containing gadolinium oxide. It has been found that these articles have excellent resistance to thermal shock, mechanical impact, abrasion, high temperature and water damage. These properties, in conjunction with its excellent nuclear properties, make these articles particularly well suited for use as neutron absorber elements in shipping containers for nuclear reactor fuel assemblies, and spent fuel storage racks.

14 Claims, 2 Drawing Sheets

NEUTRON ABSORBER ARTICLES

BACKGROUND OF THE INVENTION

The present invention is concerned with neutron absorber articles and structures for containing fissile material. It is especially directed to those neutron absorber elements, and the structures that they are incorporated into, which are designed for out of reactor uses, such as, the shipping and/or storage of fissile materials.

In the shipping and storage of nuclear reactor fuel elements and assemblies, which contain large quantities and/or enrichments of the fissile material, $U^{235}$, it is necessary to assure that criticality is avoided during normal use, as well as under potential accident conditions.

For example, fuel shipping containers are licensed by the NRC (Nuclear Regulatory Commission) to ship specific maximum fuel enrichments (i.e. weights and weight percent $U^{235}$) for each fuel assembly design. In order for a new shipping container design to receive licensing, it must be demonstrated to the satisfaction of the NRC that the new container design will meet the requirements of the NRC Rules and Regulations, including those defined in 10 CFR 71, Appendix B, which is hereby incorporated by reference. These requirements define the maximum credible accident (MCA) that the shipping container and its internal support structures must endure and maintain the subcriticality of the fuel assemblies it holds. Normally the NRC requires an actual 30-foot free fall drop test of a new loaded shipping container, puncture of the shipping container shell, exposure to 1475° F. for ½ hour, followed by immersion in water for 8 hours. This, of course, entails destruction of the container so tested.

Criticality is defined as having a sufficient mass of fissionable material in a given configuration to produce a self-sustaining neutron fissioning chain reaction. In a nuclear reactor, controlled criticality is required for power generation. However, outside of a nuclear reactor, criticality is to be avoided. It is well known that criticality can be avoided by reducing the mass of fissionable material, changing its configuration, increasing the distance between fissionable masses, and/or placing shielding (i.e. neutron absorbing materials) between fissionable masses. In nuclear fuel assembly shipping containers, all of the above parameters are used to avoid criticality. In a conventional shipping container, two fuel assemblies are held side by side on an internal support frame. A portion of the support frame is interposed between the two fuel assemblies, and contains two neutron absorber plates, each having a length and width substantially equal to the length and width of the fuel assemblies and a thickness of about 0.19 inches. In the past, these absorber plates have been, for example: an AISI 304L austenitic stainless steel containing at least about 1.3 wt. % natural boron; copper; or carbon steel. These container internals, including the absorber plates, must also be evaluated against the MCA conditions.

Fuel enrichments have been increasing as utilities increase fuel assembly discharge burnup and extend fuel cycle lengths. It is therefore desirable that fuel enrichments greater than current fuel shipping container licensed limits be shipped.

Neutron absorber elements also find use in the storage and industrial handling of fissile materials, where they are used to help limit radiation exposure to workers as well as avoid criticality incidents.

The design, manufacture and use of porcelain enamels, as well as refractory metallic-ceramic coatings are well known to those of ordinary skill in the art of metal coating and is exemplified by teachings found in: Kirk-Othmer, "Encyclopedia of Chemical Technology", Third Edition, Vol. 9, published by John Wiley & Sons, (1980), pp. 1-20, and Metals Handbook Ninth Edition, Vol. 5, "Surface Cleaning, Finishing, and Coating," published by the American Society for Metals, (1982), pp. 509-531, both pertaining to porcelain enameling; and Military Specification "Coating, Metallic-Ceramic" MIL-C-81751B, Jan. 17, 1972, pertaining to cermet coating. All three of the preceding documents are hereby incorporated by reference.

The cermets defined by the aforementioned Military Specification are industrial cermets composed largely of the refractory ceramics aluminum oxide and/or zirconium oxide and metallic aluminum and/or zirconium, with significant quantities of other oxides used as binders, such as borated glass. Minor levels of additional constituents found in the clay additions utilized, are also present. These cermets are used in applications requiring heat resistant or chemical resistant coatings such as jet exhausts or heat exchangers. Coating a steel substrate that provides shape and strength is a relatively simple spraying and fusing process which can be performed using industrial equipment and techniques that are well known to those of ordinary skill in the arts of porcelain enameling and cermet coating.

BRIEF SUMMARY OF THE INVENTION

In view of the aforementioned need to transport fuel assemblies having enrichments and therefore weights of $U^{235}$, exceeding the current licensed limits, we, the present inventors, choose to determine if there were more effective neutron absorber elements available which would meet the MCA requirements and allow for the desired increased $U^{235}$ enrichments. In this way requalification of the entire shipping container, (including all its internal structure) or qualification of a new container design, was hoped to be avoided.

In addition to meeting the requirements based on the MCA criteria, a neutron absorber element would also have to have a thickness allowing it to fit into the space available in the licensed conventional internal support frame.

With the above factors in mind we first investigated commonly available absorber materials which are more effective absorbers than the existing copper or carbon steel absorber plates. Boral and Bisco Boraflex were investigated. Boral is a dispersion of boron carbide in aluminum sandwiched between 1100 aluminum sheet and is produced by Brooks and Perkins, P.O. Box 2067, Livonia, Mich. 48151. Boraflex is similar to Boral, except that it is a dispersion of boron carbide in silicone rubber and is manufactured by Bisco (Brand Industrial Services Co.).

Boral and Boraflex were not able to withstand the 1475° F. segment of the MCA.

Borated stainless steel was also studied, but was found to be an inadequate absorber for the installation space available (maximum thickness 0.25 inch) and the increased fuel enrichment objectives.

Since the existing neutron absorbing materials did not adequately satisfy our design requirements, we pursued development of alternate materials. Suspension of boron carbide in nickel braze on a steel backing was not successful because of the required thickness and brittleness of the finished product. Flame spraying a boron carbide/stainless steel powder mix produced a coating of unacceptably low boron content. Similar attempts using gadolinium oxide, a much more effective neutron absorber, were also not successful. An adequate absorber coating was created by mixing gadolinium oxide with the clear vehicle of the high temperature paint "Pyromark 2500", marketed by Tempil Division of Big Three Industries, Inc., South Plainfield, N.J. This mixture, applied and cured on stainless steel, was capable of withstanding 1475° F., and could create an essentially black neutron absorber. The absorber plate assembly thickness would have been less than the existing absorber plate and therefore easily substituted. The coating, although it could withstand 1475° F. and subsequent thermal shock of water splash, had minimal resistance to everyday abrasion and would have required a tough protective top coat of some kind. The greatest drawback of the coating was the required time-temperature cycle necessary to properly cure it.

Our high temperature paint effort led us to the discovery of the present invention. Our invention may be summarized as a neutron absorber element in which a ductile metallic substrate has been bonded to a layer containing gadolinia as part of a refractory coating, such as, porcelain enamel, or refractory cermet. We have found that a ductile metallic substrate having a refractory cermet coating of sufficient thickness and gadolinia content to form an essentially black neutron absorber element will meet our dimensional requirements, as well as design requirements based on MCA criteria.

In a preferred embodiment of the present invention a steel sheet has a refractory cermet coating on each of its major surfaces, and each coating has a thickness and gadolinia concentration sufficient to assure that there are at least about 0.02 grams gadolinia per square centimeter of surface. Preferably the maximum thickness of the neutron absorber element according to the present invention is about 0.19 inch or less.

Our invention further includes a shipping container and its internal structure including the aforementioned refractory coated neutron absorber elements. The shipping container according to the present invention may be loaded with two fuel assemblies each containing $U^{235}$ concentrations in excess of about 3.65 weight percent $U^{235}$, and preferably in excess of about 4.3 weight percent $U^{235}$.

Our invention is however not limited to the above embodiments designed to meet the strict MCA-based requirements and dimensional requirements. Our invention, therefore, also includes gadolinia containing refractory cermet or refractory porcelain enamel coated metallic substrates designed for use as neutron shielding in the industrial handling or storage of fissile material.

These and other aspects of the present invention will become more apparent upon review of figures listed below in conjunction with the detailed specification which follows.

DETAILED DESCRIPTION OF THE INVENTION

Figure 1:
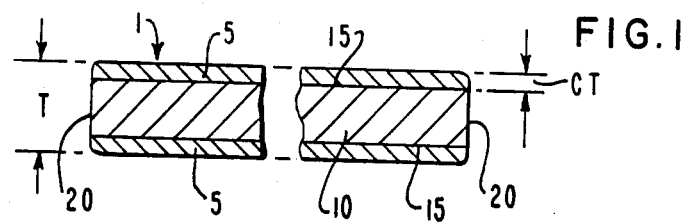
FIG. 1 shows a transverse cross section through the embodiment of a neutron absorber element in accordance with the present invention taken along section I—I of FIG. 2.
Figure 2:
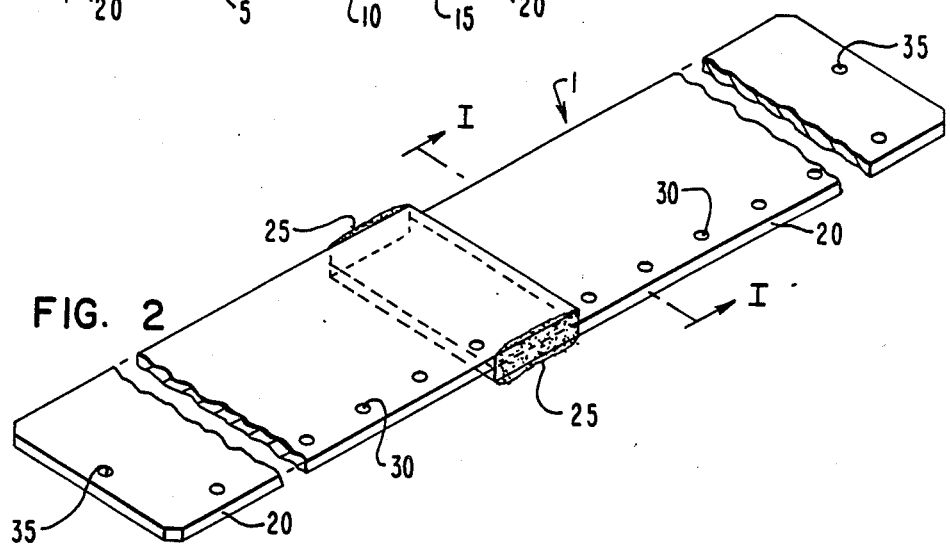
FIG. 2 shows a perspective view of an embodiment of a neutron absorber element in accordance with the present invention.

Two views of an embodiment of a neutron absorber element in accordance with the present invention are shown in FIGS. 1 and 2. In FIG. 1 a cross section of a neutron absorber element 1 is shown. The absorber element is comprised of a refractory coating 5 adherently bonded to a ductile metallic substrate 10. The substrate 10 may be any ductile metallic material meeting intended service requirements, and is preferably selected from those materials conventionally used in the enameling and cermet coating arts. For example, an enameling grade of sheet carbon steel, or stainless steel sheet, such as AISI 304, may be used in nuclear fuel assembly shipping container applications described herein. The enameling grade of sheet carbon steel preferably meets the chemistry requirements of ASTM A424. ASTM A424-80 is hereby incorporated by reference. As is common practice in the enameling and cermet coating arts, a nickel flash (i.e. thin coating) may be applied to the steel substrate prior to application of the refractory coating. This is a common method of increasing surface adhesion between the substrate and coating, but is not necessarily applied for all coatings or designs.

The refractory coating 5 is preferably a cermet coating which has been applied and bonded to the nickel coated substrate using standard enameling or cermet techniques known to those of ordinary skill in the art. The composition of coating 5 is preferably one in which the composition of a standard industrial cermet, composed mainly of borated glass, the refractory ceramics alumina and/or zirconia and aluminum and/or zirconium, has been modified by the addition of a significant concentration of gadolinia. Preferably the gadolinia is substituted principally for part of the metallic aluminum or zirconium powder in the starting composition. In accordance with a preferred embodiment of the present invention, coating 5 contains: about 10 to about 50 wt. % gadolinia; borated glass at levels normally found in industrial cermets; alumina and/or zirconia; metallic aluminum and/or zirconium; and minor levels of inorganic clay constituents.

The gadolinia is added, with the other standard raw materials during the formulation of the coating, as a powder preferably meeting the requirements of ASTM C888-78. The gadolinia starting material has a particle size between about 1 and about 10 microns, as measured by Fisher subsieve analysis. Significantly coarser gadolinium particle sizes may also be used. ASTM C888-78 is hereby incorporated by reference.

The formulated coating is applied to the substrate as a slurry, dried and then fired using standard enameling and cermet coating techniques. While the final coated article 1 may be coated on all faces or on only one, in the embodiment shown in FIG. 1, the coating 5 covers substantially all of both major faces 15 of the substrate 10, and has been intentionally removed from the side faces 20. The coating thickness CT is preferably substantially uniform and is preferably between about 0.004 to about 0.025 inches, and more preferably between about 0.008 and 0.016 inches. The thickness of the coating 5 on each face is preferably sufficient to ensure that gadolinia is present at a level of at least about 0.020 grams per square centimeter on each face, and more preferably at least about 0.025 grams per square centimeter on each face, over substantially the entire absorber element 1. At these levels there is sufficient gadolinia present in the FIG. 1 embodiment to render it substantially black or opaque with respect to thermal neutrons. In other words, substantially all thermal neutrons directed at the coatings 5 should be absorbed. It is desirable to minimize coating thickness in order to optimize the mechanical properties of the coating, such as resistance to flaking due to mechanical shock or bending.

The presence and concentration of gadolinia in the absorber element 1 is preferably verified by x-ray fluorescence techniques. Various locations across the coated element surface are tested for gadolinia concentration preferably taking measurements with a Texas Nuclear Portable Analyzer (Series 9200) or another, equivalent x-ray fluorescence analyzer. The analyzer used should be calibrated against absorber element standards having known gadolinia concentrations.

While for most applications the thickness T of the absorber element may not be critical, it is critical for use in conventional, existing nuclear fuel shipping containers having an opening 0.25 inches wide, and should therefore be less than 0.25 inches, and preferably less than 0.19 inches. For shipping containers, having a wider, or narrower, space for absorber elements, the foregoing limits may not be critical, and may not apply. While it is preferable that the thickness, T, of the absorber element 1 be substantially uniform, there may be significant departures from uniformity of thickness as shown in FIG. 2.

In FIG. 2 the neutron absorber element 1 already described in the FIG. 1 cross section is shown in perspective view. The element 1 preferably has a length and width substantially equal to that of fuel length and width in a nuclear fuel assembly. The fuel length typically ranges between about 120 and 168 inches, depending upon the assembly design. An absorber element of that length could be made in one piece with conventional commercial equipment. However, in the equipment available to us, due to the size limitations of the equipment, an absorber element of the required length could not be made in one piece. Therefore, as shown in FIG. 2, two elements were separately coated and then welded together to produce the required length. As shown in FIG. 2, TIG welds 25 on both sides of the elements were used to form a welded lap joint. Prior to TIG welding and prior to firing of the coating, the coating bisque was brushed away from the areas nearest the zone to be welded. Also shown in FIG. 2 are apertures 30 which are used for handling the element during fabrication. Apertures 35 are used for installation and removal of the plates from shipping containers. After welding, substantially all exposed areas of steel, such as side surfaces 20, and the internal walls of the apertures, are preferably painted to inhibit the formation of rust.

As already noted, for use in already existing shipping containers the absorber elements according to the present invention must meet stringent material property requirements based on the MCA criteria. The following examples will demonstrate the capabilities of the present invention, and are provided to further clarify the present invention.

An absorber element essentially as shown in FIGS. 1 and 2 was fabricated as previously described. The substrate used was an enameling grade of sheet steel meeting the ASTM A424 requirements and having a thickness of about 0.035 inches. A nickel flash coating was applied before applying the gadolinia cermet. The porous cermet coating had the composition shown in Table 1 and a thickness of about 0.0135 inches on each major face.

TABLE I

| COMPOSITION (wt. %) OF FINAL FIRED COATING | |
|---|---|
| $Gd_2O_3 \simeq$ | 31.1 |
| $Al_2O_3 \simeq$ | 23.8 |
| Al (metal) $\simeq$ | 18.0 |
| $SiO_2 \simeq$ | 11.3 |
| $B_2O_3 \simeq$ | 9.0 |
| $Na_2O \simeq$ | 3.8 |
| CaO $\simeq$ | 1.7 |
| $Fe_2O_3 \simeq$ | 1.4 |
| $K_2O \simeq$ | 0.1 |
| MgO $\simeq$ | 0.03 |
| $TiO_2 \simeq$ | 0.03 |

The absorber element dimensions were about 0.062 inches $\times$ 7.25 inches $\times$ 160 inches, with a thickness of about 0.125 inches at the welded lap joint and about 0.188 inches at the weld beads. It can clearly be seen that this absorber plate easily meets the shipping container dimensional requirements.

Figure 3:
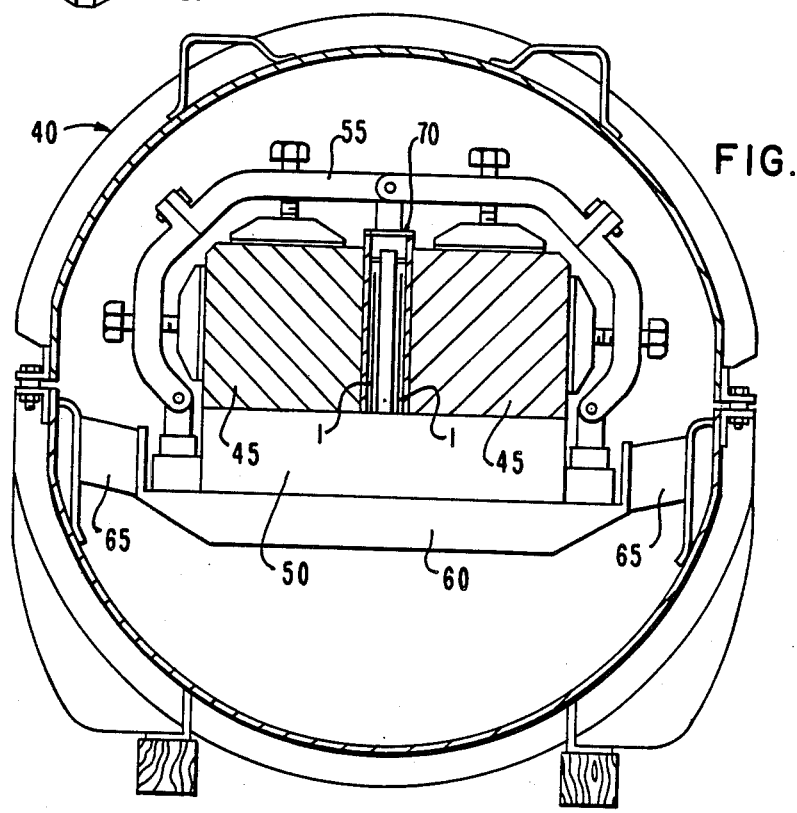
FIG. 3 shows a cross section through a nuclear fuel assembly shipping container, showing the location of the neutron absorber elements described in FIGS. 1 and 2.

Shown in FIG. 3 is a schematic transverse partial cross section through a loaded shipping container 40 in accordance with the present invention. Within the container 40 are two fuel assemblies 45 schematically shown sitting side by side and clamped onto a shipping container support frame 50 by clamping frames 55. This whole assembly is connected to the container 40 by a shock mounting frame 60 and shock mountings 65. The support frame 50 has a vertically extending section 70 which extends between the fuel assemblies 45 and contains sealed within it at least two neutron absorber elements 1 according to the present invention. The location of the absorber elements 1 within support frame section 70 is shown in more detail in FIG. 4.

Figure 4:
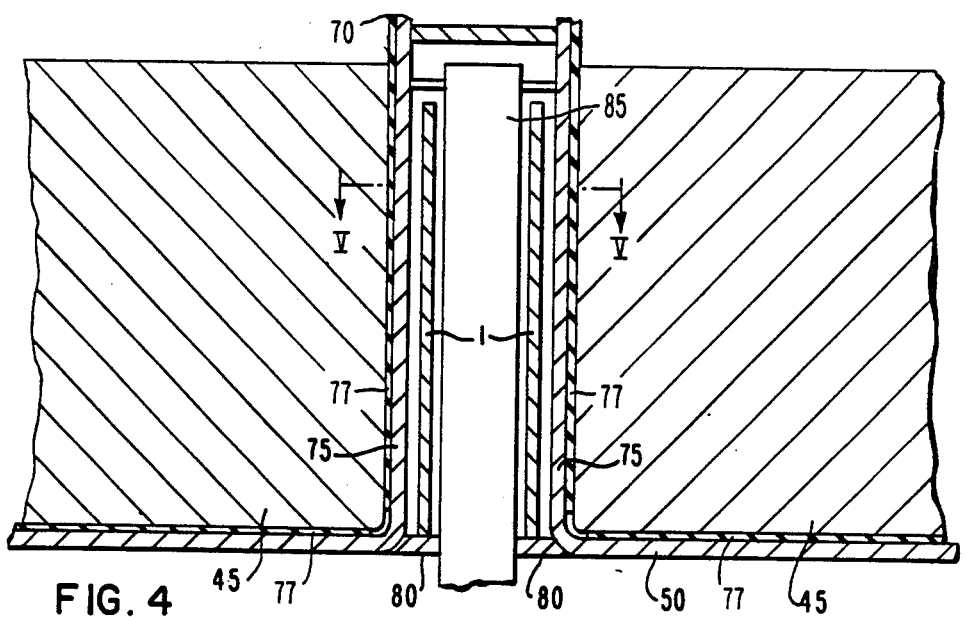
FIG. 4 is an enlarged schematic view of the shipping container support frame, fuel assemblies and neutron absorber elements shown in FIG. 3.
Figure 5:
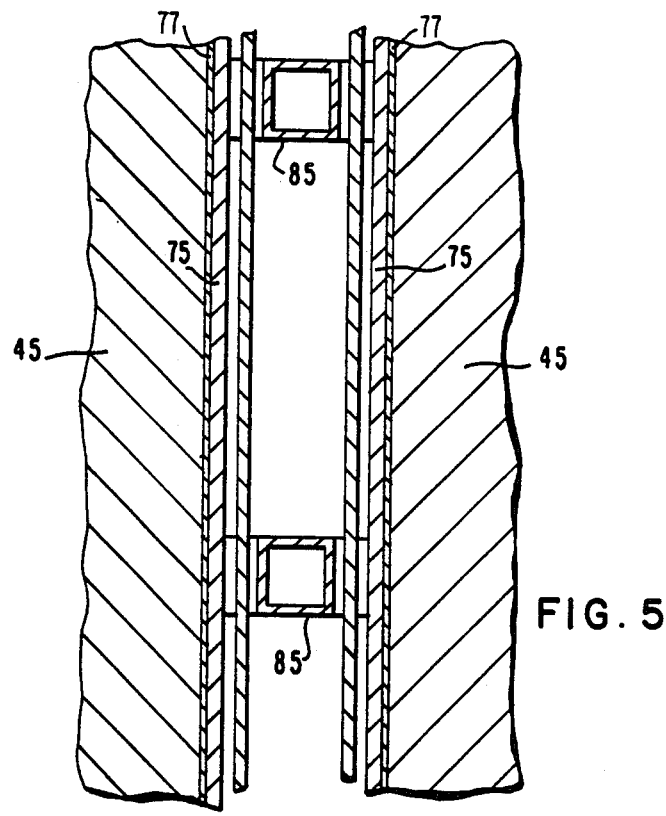
FIG. 5 is a cross section through the support frame and neutron absorber elements viewed along section V—V of FIG. 4.

In FIG. 4 it can be seen that the fuel assemblies rest against the support frame 50 and support frame section 70, which are a continuous skin of sheet steel 75 having a layer of a rubber-cork cushioning material 77 on its outside surfaces. Within the support frame section 70 the absorber plates rest on ¼ inch wide $\times$ 1.5 inch length support pads 80 distributed along the length of section 70. The absorber elements 1 are each located between the skin 75 and a ladder-like frame of 1.5 inch square tubing 85 spaced approximately every 20–24 inches as shown in FIG. 5.

Conventional Westinghouse shipping containers (and their internals), such as RCC, RCC1, RCC2, RCC3 and RCC4 are described in greater detail in certificate of compliance No. 5450, Docket 71-5450, U.S. Nuclear Regulatory Commission, Division of Fuel Cycle and Material Safety, Office of Nuclear Material Safety and Safeguards, Washington, DC 20555. Docket 71-5450 is hereby incorporated by reference in its entirety.

In this application the absorber elements 1 must be able to flex without causing the coating to flake off. More specifically the absorber element must be able to accommodate a bow of approximately 2 inches over an unsupported length of 20 inches (the minimum distance between tubular members 85). A simple simulation of this condition with a section from a full size absorber element revealed no noticeable cracking or flaking of the coating. A slight permanent set in the steel substrate was produced by this test. Expected handling and service of the plates will not exceed the capability of them to flex without functional impairment.

As part of the MCA, the loaded container is subjected to a 30-foot free drop onto a hard surface. Since the internals suspension system cannot absorb all internals energy, mechanical shock of the internals will occur. In order to demonstrate the impact resistance of the present absorber elements, elements alone were subjected to a 30-foot free drop to a comparatively unyielding steel plate ($\frac{1}{2}$ inch thick). The elements were dropped, using guide wires, in the flat (element width horizontal) and guillotine (element width vertical) configurations. The flat configuration only yielded the steel substrate with no obvious coating damage. The guillotine configuration, where the element dropped on edge, caused local deformation of the element edge and random flaking of the coating edge up to $\frac{1}{8}$ inch away from the plate edge. The bulk of the coating was unaffected by the severe shock. These tests demonstrated that the coating is capable of withstanding impacts far greater than it will see under accident conditions in its protected location inside the shipping container support frame.

The absorber elements 1, positioned within the support frame section 70, are not exposed to conditions where abnormal abrasion forces would occur. The edges of the elements do not need to be coated, and purposely are not coated, although the coating operation may tend to deposit material there. The bottom edge of the element interfaces with the internals and bears the weight of the element. Therefore, the edges of the elements which have been coated and fused are abraded to base metal to eliminate the generation of gadolinium bearing debris and its possible migration from the container during inspection, cleaning, painting, etc.

The sides of the elements see negligible loads and broad contact areas. The coating is not easily affected by distributed loads; significant manually applied pressure with a hard, sharp edge tool is necessary to visibly scar the coating surface. The coating is therefore adequately abrasion resistant to withstand its service environment and maintain its functional capabilities.

The MCA essentially requires the container and its contents to withstand 1475° F. for $\frac{1}{2}$ hour and subsequent cooldown. Commercially available materials were either inadequate as neutron absorbers or deteriorate upon exposure to 1475° F.

Sample elements were arranged in a muffle furnace to simulate their interface with the shipping container internals and each other. The purpose of the test was to verify that the element's coating would not be altered by contact with interfacing surfaces such that its functional characteristics were affected. Once arranged, the furnace was turned on, stabilized at 1475° F. for $3\frac{1}{2}$ hours and then turned off. The furnace door was opened and the elements removed when the indicated temperature had dropped to approximately 200° F. The elements were not noticeably altered in either case from their pre-test condition.

The NRC regulations specify exposure to a radiation environment of 1475° F. with an emissivity coefficient of 0.9 and package absorption coefficient of 0.8. Consequently, the package is heating up to its maximum temperature during that $\frac{1}{2}$ hour period. Also, cooling of the package realistically begins as soon as the radiation environment is removed. The test performed is submitted to be conservative since the elements were held at 1475° F. for the entire $\frac{1}{2}$ hour period, as well as the subsequent 3 hour period where natural cooling is permitted.

The elements were then individually heated to 1475° F., removed at that temperature and subjected to poured room temperature water on one side. The elements were again heated, removed and then quenched in a bucket of room temperature water. The elements did not exhibit any noticeable cracks, flaking or separations. The elements demonstrated resistance to thermal shock adequate for any thermal shock the elements could possibly experience in a shipping container.

These tests demonstrated that the absorber elements are capable of meeting the required high temperature accident conditions as well as severe thermal shock.

The absorber element coating, by its characteristic cermet nature, is essentially impervious to water exposure for an 8 hour period. No tests were performed.

The nuclear design of the fuel shipping containers equipped with these absorber elements was performed using established codes and techniques. The advantages resulting from the use of our absorber elements can clearly be seen by comparing Table II, previously authorized package contents, with the package contents that we submit to be now allowable according to our invention as shown in Table III. The 14×14 and 16×16 enrichment of 5.0 wt. % is an arbitrary limit. Higher limits are possible with the given arrangement.

TABLE II

PACKAGE CONTENTS USING CONVENTIONAL ABSORBER ELEMENTS IN WESTINGHOUSE CONVENTIONAL CONTAINERS AND INTERNALS (i) Uranium dioxide as zircaloy or stainless steel clad unirradiated fuel assemblies. Two (2) neutron absorber elements consisting of 0.19" thick, full length stainless steel containing 1.3% minimum boron or 0.19" thick OFHC copper are required between fuel assemblies of the following specifications:

| Type | 14 × 14 Zr* Clad | 15 × 15 Zr Clad | 14 × 14 SST* Clad | 15 × 15 SST Clad | 17 × 17 Zr Clad | 16 × 16 Zr Clad | 14 × 14 Zr Clad |
|---|---|---|---|---|---|---|---|
| Pellet diameter (nom), in. | 0.344– 0.367 | 0.367 | 0.384 | 0.384 | 0.308– 0.322 | 0.322 | 0.3805 |

TABLE II-continued

PACKAGE CONTENTS USING CONVENTIONAL ABSORBER ELEMENTS IN WESTINGHOUSE CONVENTIONAL CONTAINERS AND INTERNALS

| | | | | | | | |
|---|---|---|---|---|---|---|---|
| Rod diameter (nom), in. | 0.400–0.422 | 0.422 | 0.422 | 0.422 | 0.360–0.374 | 0.374 | 0.44 |
| Maximum fuel length, in. | 144 | 144 | 120 | 120 | 168 | 144 | 144 |
| Maximum rods/assembly | 180 | 204 | 180 | 204 | 264 | 235 | 176 |
| Maximum cross section, (nom), in sq. | 7.8 | 8.4 | 7.8 | 8.4 | 8.4 | 7.8 | 7.98 |
| Maximum U-235/assembly, kgs | 17.7 | 18.3 | 18.5 | 18.7 | 16.95 (144"L) 19.8 (168"L) | 16.6 | 19.0 |
| Maximum U-235 enrichment w/o | 4.0 | 3.65 | 4.0 | 3.65 | 3.65 | 4.0 | 3.85 |

(ii) Uranium dioxide as zircaloy clad unirradiated fuel assemblies contained within the Model No. RCC-4 packaging. Two (2) neutron absorber elements consisting of 0.19" thick carbon steel are required between fuel assemblies of the following specifications.

| Type | 17 × 17 Zr Clad |
|---|---|
| Pellet diameter, in. | 0.308–0.322 |
| Rod diameter, in. | 0.360–0.374 |
| Maximum fuel length, in. | 168 |
| Maximum rods/assembly | 264 |
| Maximum cross section, (nom) in. sq. | 8.4 |
| Maximum U-235/assembly, kgs. | 19.3 |
| Maximum U-235 enrichment, w/o | 3.55 |

*Zr = zircaloy; SST = stainless steel

TABLE III

PACKAGE CONTENTS USING ABSORBER ELEMENTS ACCORDING TO THE PRESENT INVENTION IN WESTINGHOUSE CONTAINERS AND INTERNALS

Uranium dioxide as zircaloy or stainless steel clad unirradiated fuel assemblies. Two (2) neutron absorber elements consisting of carbon steel, 0.035 inches in thickness, with a coating containing $Gd_2O_3$ affixed to each side of the element (0.02 gm $Gd_2O_3/cm^2$) are required between fuel assemblies of the following specifications:

| Type | 14 × 14 Zr Clad | 15 × 15 Zr Clad | 14 × 14 SST Clad | 15 × 15 SST Clad | 17 × 17 Zr Clad | 16 × 16 Zr Clad |
|---|---|---|---|---|---|---|
| Pellet diameter (nom), in. | 0.344–0.367 | 0.367 | 0.384 | 0.384 | 0.308–0.322 | 0.322 |
| Rod diameter (nom), in. | 0.400–0.422 | 0.422 | 0.422 | 0.422 | 0.360–0.374 | 0.374 |
| Maximum fuel length, in. | 144 | 144 | 120 | 120 | 168 | 144 |
| Maximum rods/assembly | 180 | 204 | 180 | 204 | 264 | 235 |
| Maximum cross section, (nom), in sq. | 7.8 | 8.4 | 7.8 | 8.4 | 8.4 | 7.8 |
| Maximum U-235/assembly, kgs | 22.1 | 21.5 | 23.1 | 22.0 | 19.9 (144"L) 23.3 (168"L) | 20.7 |
| Maximum U-235 enrichment w/o | 5.0 | 4.3 | 5.0 | 4.3 | 4.3 | 5.0 |

The foregoing examples while having clearly demonstrated the capabilities of the present invention, are purely exemplary and should not be construed to limit our invention to the element geometry and sizes shown, or the element properties described. Our absorber elements may be used in new shipping container designs as well as old, already licensed designs. Our absorber elements may also be used wherever the storage and handling of fissile materials will benefit by neutron shielding. It is specifically contemplated that our absorber elements may be incorporated into the structures used to handle and store spent nuclear fuel assemblies. In these applications, where the absorber element may be required to be normally under water for at least a portion of the time, it is contemplated that the metallic substrate is preferably a stainless steel, such as AISI 304.

In applications, other than the described shipping container application, where mechanical property requirements, such as resistance to flaking due to bending and shock, may not be as critical, or as severe, the preferred cermet coating may be replaced by a porcelain enamel containing gadolinia.

Other embodiments of the invention will become more apparent to those skilled in the art from a consideration of the specification or practice of the invention disclosed herein. It is intended that the specification and examples be considered as exemplary only, with the true scope and spirit of the invention being indicated by the following claims.

We claim:

1. In combination with a nuclear fuel shipping container, the combination comprising:
   means for supporting nuclear fuel assemblies;
   at least two neutron absorber elements; each major side of said absorber elements loaded with at least about 0.020 gm Gd2O3 per square centimeter; and said neutron absorber elements contained within said means for supporting nuclear fuel assemblies each of said at least two neutron absorber elements comprising
   a ductile metallic substrate and
   a refractory coating;
   said refractory coating bonded to the exterior of said metallic substrate;
   said refractory coating containing said at least about 0.020 gm Gd2O3 per square centimeter which is sufficient to render said refractory coating substantially opaque to thermal neutrons;
   said refractory coating being selected from the group consisting of (porcelain enamels and) cermets composed essentially of gadolinia; clay constituents; a borated glass; and alumina and/or zirconia and aluminum and/or zirconium.

2. The combination according to claim 1 further comprising: two nuclear fuel assemblies mounted on said means for supporting nuclear fuel assemblies; and wherein at least two of said neutron absorber elements are located between said nuclear fuel assemblies.

3. The combination according to claim 2 wherein each of said nuclear fuel assemblies contains at least about 19.9 Kg of $U^{235}$.

4. The combination according to claim 2 wherein each of said nuclear fuel assemblies has a $U^{235}$ enrichment of at least about 4.3 wt. %.

5. The combination according to claim 2 wherein each of said nuclear fuel assemblies has a $U^{235}$ enrichment of at least about 4.3 wt. %.

6. The combination according to claim 1 wherein said refractory coating is 4 to 25 mils thick.

7. The combination according to claim 1 wherein said ductile metallic substrate is steel.

8. The combination according to claim 1 wherein said refractory coating is composed essentially of: gadolinia; clay constituents; a borated glass; and a metal and a refractory oxide of said metal selected from the group consisting of aluminum and alumina, and zirconium and zirconia, alone or in combination with each other.

9. The combination according to claim 1 wherein said ductile metallic substrate is a sheet steel; wherein said refractory coating covers both major surfaces of said sheet steel, and has a total coating thickness of 8 to 50 mils.

10. The combination according to claim 7 further comprising a nickel coating interposed between said steel substrate and said refractory coating.

11. The combination according to claim 1 wherein said ductile metallic substrate is stainless steel.

12. The combination according to claim 11 further comprising a nickel coating interposed between said stainless steel substrate and said refractory coating.

13. The combination according to claim 1 wherein said refractory coating comprises aluminum and alumina.

14. The combination according to claim 13 wherein said refractory coating consists essentially of:
    about 31.1 weight percent Gd2O3:
    about 23.8 weight percent Al2O3;
    about 18.0 weight percent Al;
    about 11.3 weight percent SiO2;
    about 9.0 weight percent B2O3; and
    the balance consisting essentially of clay constituents.

* * * * *